(12) United States Patent
Yamashita et al.

(10) Patent No.: US 8,116,608 B2
(45) Date of Patent: Feb. 14, 2012

(54) METHOD AND APPARATUS FOR REPRODUCING VIDEO AND AUDIO

(75) Inventors: Michio Yamashita, Inagi (JP); Koichi Nakazato, Ome (JP); Takashi Mori, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 12/708,454

(22) Filed: Feb. 18, 2010

(65) Prior Publication Data

US 2010/0220974 A1    Sep. 2, 2010

(30) Foreign Application Priority Data

Feb. 27, 2009    (JP) .................................. 2009-046867

(51) Int. Cl.
| | |
|---|---|
| H04N 5/932 | (2006.01) |
| H04N 5/935 | (2006.01) |
| H04N 5/931 | (2006.01) |
| H04N 5/76 | (2006.01) |
| H04N 7/12 | (2006.01) |
| H04N 11/02 | (2006.01) |
| H04N 11/04 | (2006.01) |
| H04N 7/00 | (2006.01) |
| H04N 11/00 | (2006.01) |
| H04N 9/475 | (2006.01) |

(52) U.S. Cl. ........ 386/201; 386/205; 386/206; 386/207; 386/208; 348/231.4; 348/423.1; 348/424.1; 348/462; 348/512; 348/513

(58) Field of Classification Search ............... 348/231.4, 348/423.1, 424.1, 462, 512, 513; 386/201, 386/205, 206, 207, 208
See application file for complete search history.

(56) References Cited

U.S. PATENT DOCUMENTS

| | | | |
|---|---|---|---|
| 6,215,505 | B1 | 4/2001 | Minami et al. |
| 7,286,749 | B2 | 10/2007 | Shiiyama |
| 7,623,756 | B2 * | 11/2009 | Komori et al. ................ 386/343 |
| 2006/0044955 | A1 | 3/2006 | Komori et al. |
| 2008/0037953 | A1 * | 2/2008 | Kawamura et al. ............. 386/75 |

FOREIGN PATENT DOCUMENTS

JP    11-187333    7/1999
(Continued)

OTHER PUBLICATIONS

Japanese Patent Application No. 2009-046867; Notice of Reasons for Rejection; Mailed Aug. 17, 2011 (English Translation).

(Continued)

*Primary Examiner* — Thai Tra
*Assistant Examiner* — Daquan Zhao
(74) *Attorney, Agent, or Firm* — Blakely, Sokoloff, Taylor & Zafman LLP

(57) ABSTRACT

According to one of embodiments, a method and apparatus for reproducing video and audio changes a playback speed for video and a playback speed for audio independently of each other. To provide an apparatus and method for controlling the playback speeds shortly before a period in which the video and audio should better be played back at a normal-speed, thereby to reduce the strange feeling the user may have as the playback changes from the high-speed playback to the normal-speed playback, a video signal and an audio signal are first isolated from a content and then demodulated. A playback speed is set for the video signal modulated, and a playback speed is set for the audio signal modulated. The video signal and the audio signal, each set to a playback speed, are output.

10 Claims, 9 Drawing Sheets

FOREIGN PATENT DOCUMENTS

| | | |
|---|---|---|
| JP | 2001-307431 | 11/2001 |
| JP | 2002-084505 | 3/2002 |
| JP | 2003-309814 | 10/2003 |
| JP | 2005-236527 | 9/2005 |
| JP | 2006-054746 | 2/2006 |
| JP | 2007-318200 | 6/2007 |
| JP | 2008-154258 | 7/2008 |
| WO | 2006082787 A1 | 8/2006 |

OTHER PUBLICATIONS

Japanese Patent Application No. 2009-046867; Notice of Reasons for Rejection; Mailed May 11, 2010 (English translation).

* cited by examiner

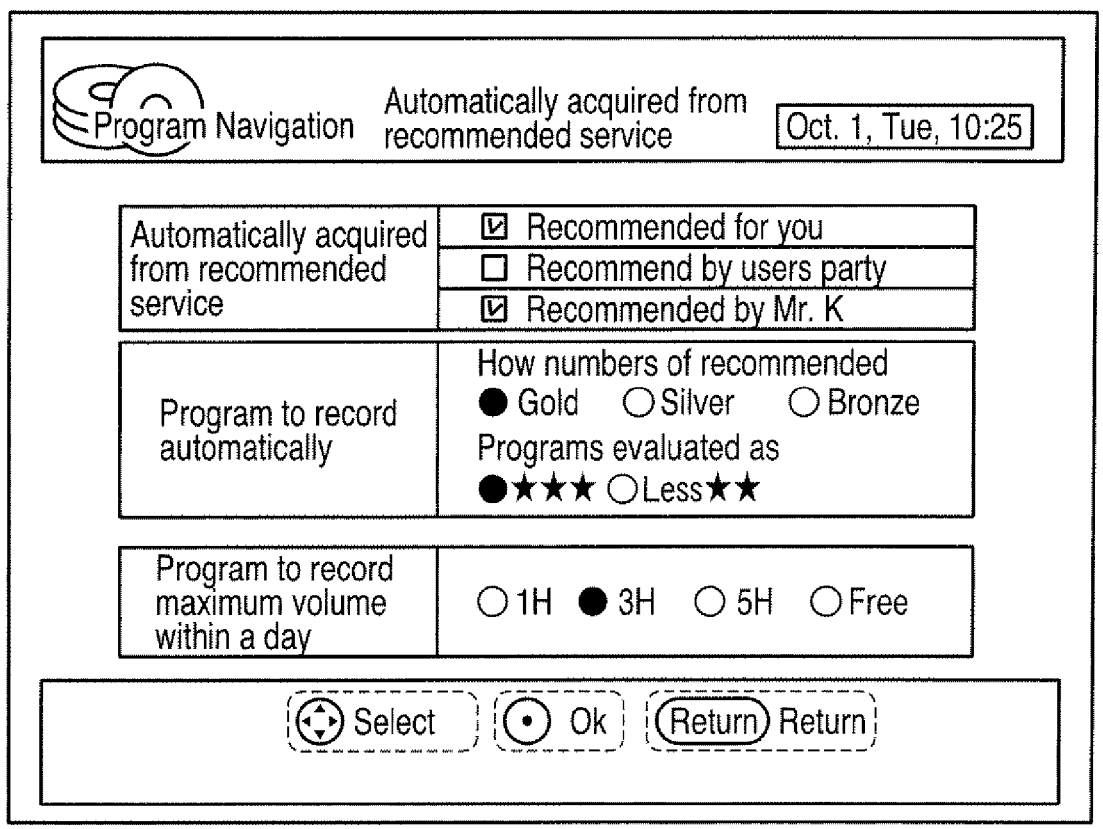
F I G. 2
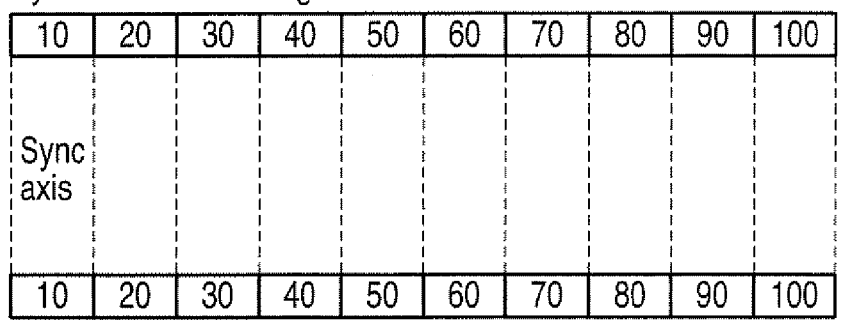
F I G. 3

METHOD AND APPARATUS FOR REPRODUCING VIDEO AND AUDIO

CROSS-REFERENCE TO RELATED APPLICATIONS

This application is based upon and claims the benefit of priority from Japanese Patent Application No. 2009-046867, filed Feb. 27, 2009, the entire contents of which are incorporated herein by reference.

BACKGROUND

1. Field

One embodiment of the present invention relates to a video and audio reproduction apparatus and a method for reproduction of the video and audio, both able to change a playback speed for video and a playback speed for audio independently of each other.

2. Description of the Related Art

Video and audio are now recorded in various methods, giving users opportunities to reproduce various types of recorded content.

The time available for playing back the content is not always sufficient. This is why the video and audio reproduction apparatus may practically be operated in a mode, such as N-times playback mode, increasing the playback speed by a specific rate.

If the playback speed is so increased, however, the scenes played back may become clearly discontinuous. In some cases, the audio played back may not be as natural as desired.

In view of this, various video and audio reproduction methods have been proposed, in which a playback speed for video and a playback speed for audio are set to different values.

PCT International Publication WO 2006/082787 discloses a record reproduction apparatus and a record reproduction method. The apparatus comprises a speed determination unit, an audio playback speed changing unit, and a video playback speed changing unit. The speed determination unit determines two appropriate speeds of reproducing an audio signal and a video signal, respectively, from the characteristics of the audio and video signal, which an audio and video (AV) data analyzing unit has detected. The audio playback speed changing unit changes the speed of reproducing the audio signal to the appropriate audio signal reproduction speed determined by the speed determination unit. The video playback speed changing unit changes the speed of reproducing the video signal to the appropriate video signal playback speed determined by the speed determination unit.

The above-identified publication indeed discloses the technique of reproduce the video signal and audio signal of a recorded content, at different speeds higher than the normal speed. However, the publication describes neither a technique of linking the video signal and the audio signal in reproducing them independently nor any conditions for linking the video and audio signals.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary diagram showing an example of information, i.e., preset conditions for playback, such as a recommended menu and a recommended service, which the video and audio reproduction apparatus of FIG. 1 cannot acquire directly from content, according to an embodiment of the invention; example of how a video signal and an audio signal are synchronized in the video and audio reproduction FIG. 3 is an exemplary diagram showing an apparatus of FIG. 1, according to an embodiment of the invention;

DETAILED DESCRIPTION

Various embodiments according to the invention will be described hereinafter with reference to the accompanying drawings. In general, according to one embodiment of the invention, a video and audio reproduction apparatus comprising: an isolation module configured to isolate a video signal and an audio signal from a content; a video demodulator configured to demodulate the video signal isolated by the isolation module; an audio demodulator configured to demodulate the audio signal isolated by the isolation module; a video playback speed setting module configured to set a speed at which to reproduce the video signal; an audio playback speed setting module configured to set an audio playback speed at which to reproduce the audio signal; and a signal processor configured to process the video signal at the video playback speed set by the video playback speed setting module and demodulated by the video demodulator and the audio signal at the audio playback speed set by the audio playback speed setting module and demodulated by the audio demodulator, such that the video signal and the audio signal are made reproducible the video and audio reproduction apparatus.

Embodiments of this invention will now be described hereinafter in detail with reference to the accompanying drawings.

Figure 1:
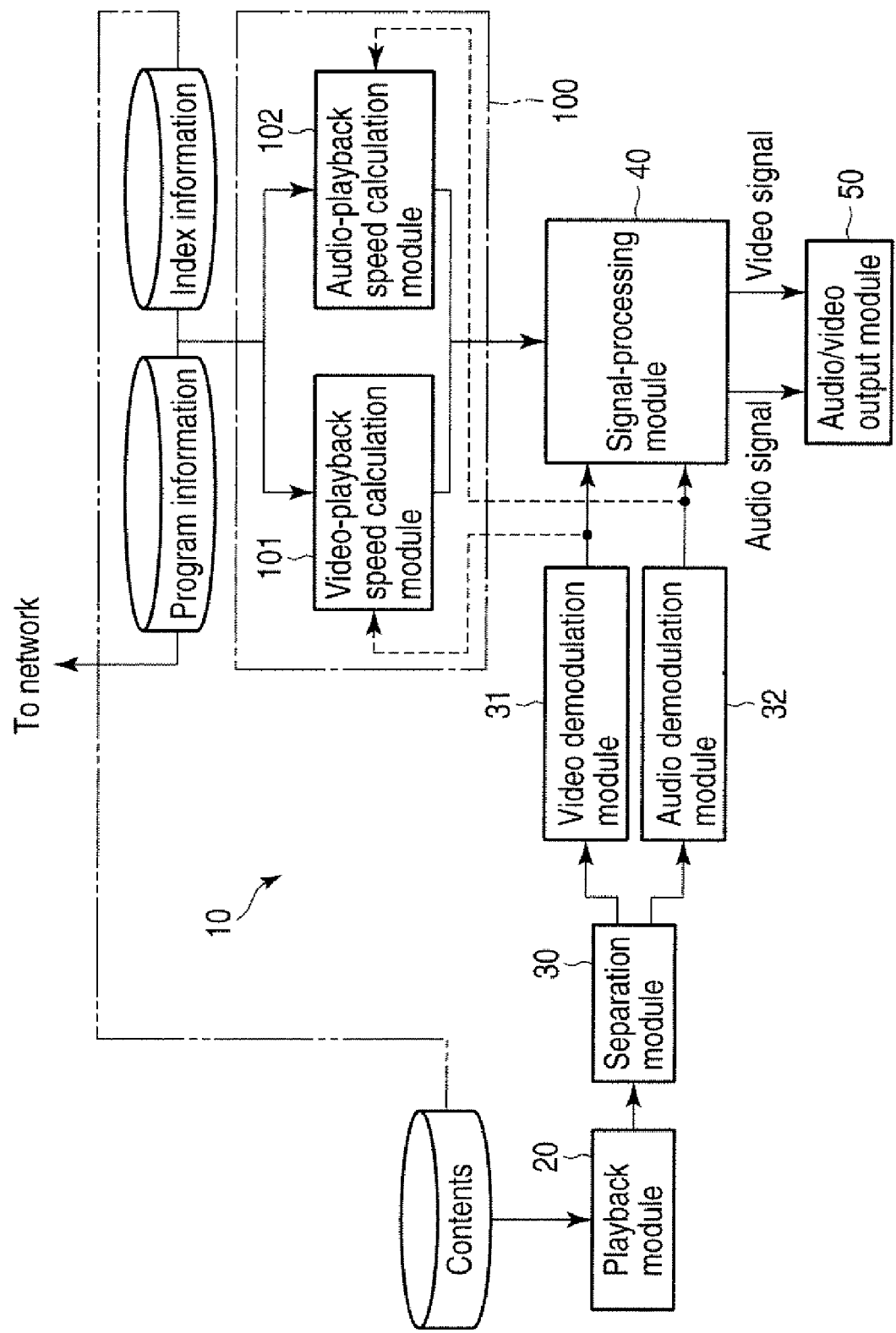
FIG. 1 is an exemplary diagram showing an example of a video and audio reproduction apparatus can be applied, according to an embodiment of the invention.

FIG. 1 is a diagram relating a video and audio reproduction apparatus according to an embodiment of the present invention, or a player apparatus that can playback the content stored in, for example, a hard disk drive (HDD). Note that signals may be recorded on and reproduced from a recording medium in any method available, in, for example, a player apparatus incorporating a Digital Versatile Disk (DVD), a personal computer (PC) having an HDD or DVD drive, a television receiver incorporating an HDD or DVD drive, a portable media player capable of playing back content stored in a semiconductor memory card such as a Secure Digital (SD) card. The content may, of course, be compressed in any format.

The video and audio reproduction apparatus 10 shown in FIG. 1 includes a playback module 20, an isolation module 30, a video demodulation module 31, an audio demodulation module 32, and a signal processing module 40. The playback module 20 plays back the content held in a given recording medium. The isolation module 30 isolates video data and audio data from the reproduced signal that has been expanded from a compressed form. The video demodulation module 31 demodulates the video data the isolation module 30 has isolated from the reproduced signal. The audio demodulation module 32 demodulates the audio data the isolation module 30 has isolated from the reproduced signal. The signal processing module 40 processes the video signal and the audio signal supplied from the video demodulation module 31 and audio demodulation module 32, respectively. A video and audio output apparatus 50 is provided, either incorporated in, or arranged outside, the video and audio reproduction apparatus 10. The video and audio output apparatus 50 reproduces the video output and audio output of the signal processing module 40, respectively.

Speed data is input to the signal processing module 40 from a playback speed setting module 100. The playback speed setting module 100 includes a video playback speed calculation module 101 and an audio playback speed calculation module 102. The video playback speed calculation module 101 sets the video playback speed at which to reproduce a video signal output from the video demodulation module 31, at a non-liner playback speed other than the normal playback speed. The audio playback speed calculation module 102 sets an audio playback speed at which to reproduce an audio signal output from the audio demodulation module 32, at a non-liner playback speed other than the normal playback speed.

The playback speed setting module 100 (i.e., combination of the video playback speed calculation module 101 and audio playback speed calculation module 102) can use program information and index information as information from which to calculate the video speed and audio speed. The program information can be acquired from outside. The index information has been acquired at the time of, for example, recording the content or contents.

The program information is composed of keywords, performers, genres, broadcast hours, etc., which can be obtained from, for example, an electronic program guide (EPG), or has been generated by the manufacturer of the player or the user thereof. The program information includes an information item (i.e., preset conditions for playback), such as recommended menu and recommended service, which cannot be acquired directly from content obtainable from the servers on networks. FIG. 2 shows an exemplary service menu (i.e., recommended service) displayed on the screen of the video and audio output apparatus 50 that is connected to the video and audio playback apparatus 10 shown in FIG. 1.

FIG. 3 shows the relation that the sync axis of video signal and that of audio signal have at the time of normal-speed playback, i.e., the signal sync value relation that the video and audio played back have with respect to the time axis.

As shown in FIG. 3, prior to the normal-speed playback, a signal sync value is applied to both the video signal and the audio signal, synchronizing the video signal and the audio signal with each other. To achieve the normal-speed playback, the video signal and the audio signal are reproduced in accordance with the signal sync values applied to them. Thus, the sync axes of the video and audio signals, i.e., the signal sync values applied to the time axes of video and audio, respectively, are completely identical in most cases.

Figure 4:
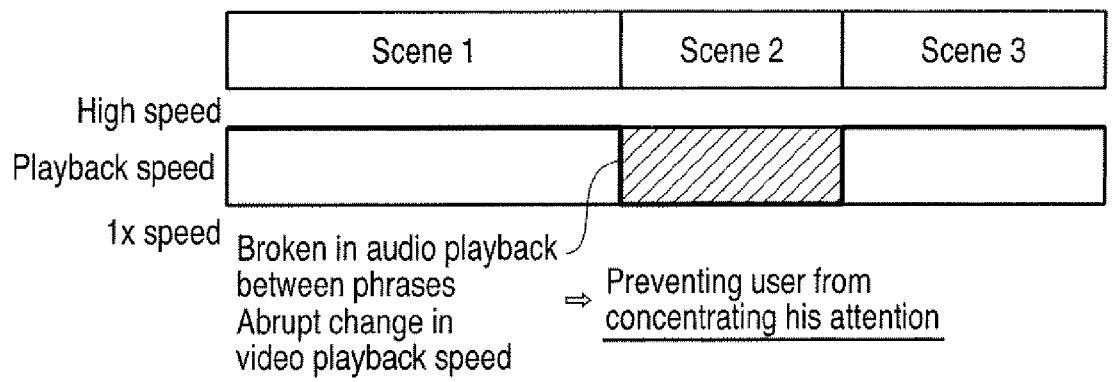
FIG. 4 is an exemplary diagram showing an example of influence when the playback speed is changed between a given high-speed and a normal-speed in the video and audio reproduction apparatus of FIG. 1, according to an embodiment of the invention.

FIG. 4 is a schematic diagram explaining how Scene 2 that appears between Scene 1 and Scene 3 is subjected to high-speed playback, while Scene 1 and Scene 3 are subjected to normal-speed playback.

As seen from FIG. 4, when the video being played back at a high-speed is changed from Scene 1 to Scene 2, the playback speed may be abruptly changed in order to reproduce Scene 2 at the normal-speed. In this case, the audio may be played back, abruptly in a large volume, as the playback is started at a middle part of a phrase, inevitably preventing the user from concentrating his or her attention on the content being played back. Similarly, the video may be played back, abruptly changing in brightness, rendering it hard for the user to keep viewing the video of the content being played back.

Figure 5:
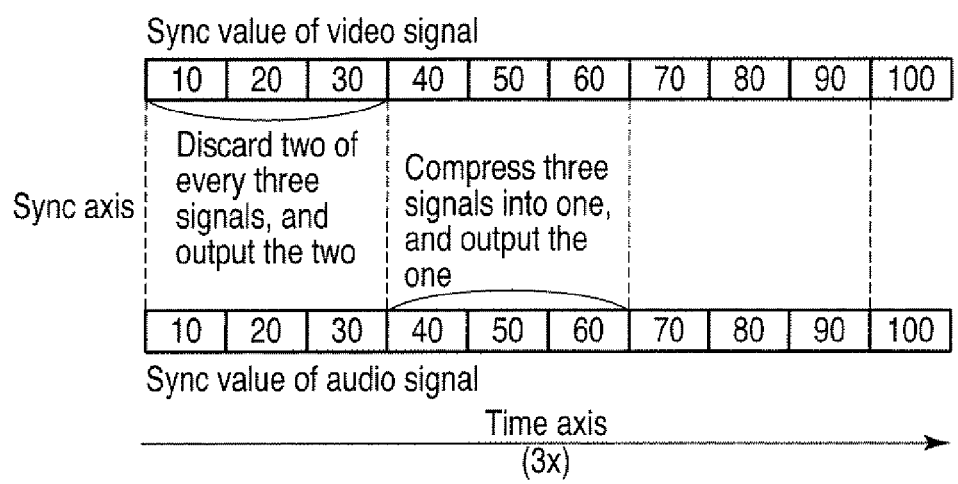
FIG. 5 is an exemplary diagram showing an example of a method for synchronizing the video signal and the audio signal in the case where the high-speed playback is performed at, for example, the 3×-speed as shown in FIG. 4, according to an embodiment of the invention.

FIG. 5 shows a method of synchronizing the video signal and the audio signal with each other in the case where the high-speed playback is performed at the 3×-speed. Of the video signal, two of every three blocks are discarded (not reproduced) in most cases. In contrast, the audio signal is compressed in most cases so that every three blocks may be reproduced within a time equivalent to one block.

In other words, the signal processing module 40 refers to the signal sync values and some block parts of the video signal are discarded, in accordance with a multiple designated, thereby reproducing the video at high-speed. On the other hand, the signal processing module 40 compresses the audio signal, and then reproducing the audio, while maintaining the pitch of audio. Various methods of compressing the audio signal, though not described here, have been put to practical use.

Figure 6:
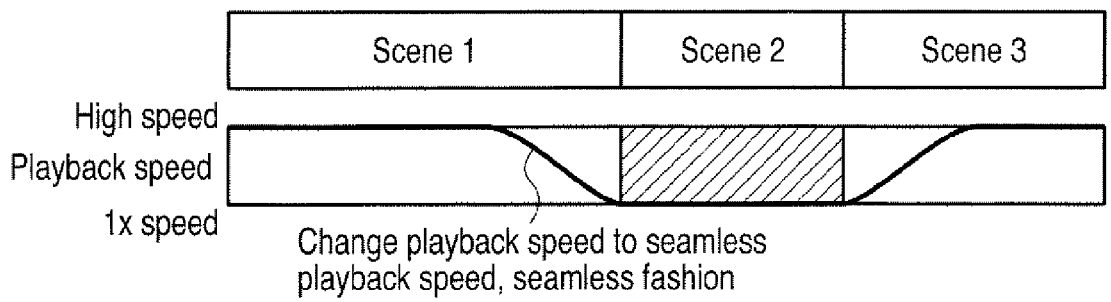
FIG. 6 is an exemplary diagram showing an example of a seamless playback method that can suppress an influence on the video and audio when playback speed is changed between a given high-speed and a normal-speed in the video and audio reproduction apparatus of FIG. 1, according to an embodiment of the invention.

FIG. 6 illustrates the principle of seamless playback performed in the video and audio playback apparatus of FIG. 1 to suppress an adverse influence on the video and the audio, both being played back when the playback mode is changed from the high-speed playback to the normal-speed playback, or vice versa.

Scenes 1 and 3 may be subjected to the high-speed playback, whereas Scene 2 located between Scenes 1 and 3 is subjected to the normal-speed (N×-speed) playback (in which the speed factor "N" is 1). In this case, of the blocks that precede on the time axis, by a specific time, the start of Scene 2 being played back at the N×-speed (N being a given number), those blocks to reproduce per unit time are gradually decreased in number, gradually reducing the playback speed of Scene 1. The content can therefore be played back at a speed that gradually and smoothly changes from a high-speed to the normal-speed. This reduces the strange feeling the user may have as the playback changes from the high-speed playback to the normal-speed playback.

Figure 7:
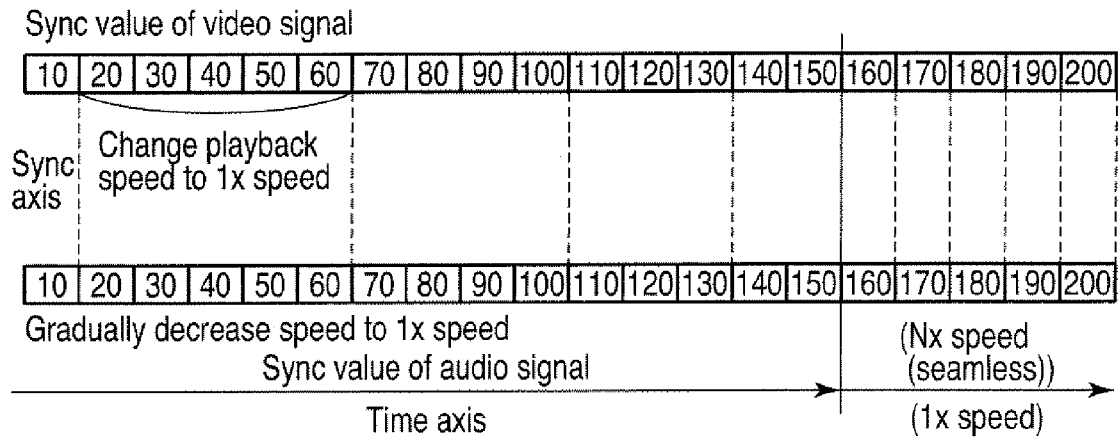
FIG. 7 is an exemplary diagram showing an example of a method for synchronizing, during the seamless playback, the video signal and the audio signal when the playback speed mode is changed between a given high-speed playback and a normal-speed playback as shown in FIG. 6, according to an embodiment of the invention.

In the seamless playback shown in FIG. 6, the number of blocks reproduced per unit time is gradually decreased as will be explained in detail with reference to FIG. 7. That is, both the video signal and the audio signal are reproduced first at 5×-speed (N×-speed, (N being a given number)), then at 4×-speed, next at 3×-speed, further at 2×-speed, and finally at a speed near 1×-speed (normal-speed). That is, the widths of the sync axes for the video and audio signals narrowly, respectively, are decreased to change the playback speed smoothly.

Figure 8:
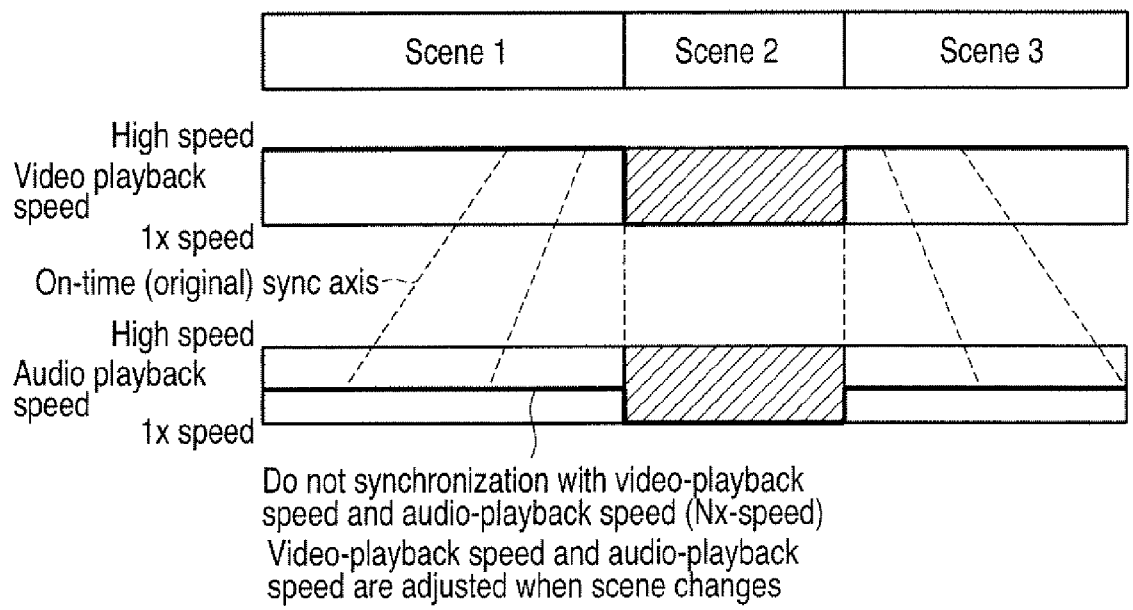
FIG. 8 is an exemplary diagram showing an example of a method of changing the scene playback speed, which can reduce the influence on video and audio when the playback speed is changed between a given high-speed and a normal-speed in the video and audio reproduction apparatus of FIG. 1, according to an embodiment of the invention.

FIG. 8 shows the principle of the scene playback speed changing (video and audio shifting), which is an exemplary playback method that can reduce the influence on video and audio when the playback speed is changed from a given high-speed to a normal-speed.

Scenes 1 and 3 may be subjected to the high-speed playback, whereas Scene 2 located between Scenes 1 and 3 is undergoing the normal-speed playback in the video and audio playback apparatus of FIG. 1. In this case, the audio may be played back more slowly than the video, starting at any time before Scene 2 is played back the N×-speed (N being a given number). This solves the problem that the user may hardly hear the audio played back. Note that, the audio reproduction speed is controlled when Scene 2 starts, in order to synchronize the audio with the video.

Figure 9:
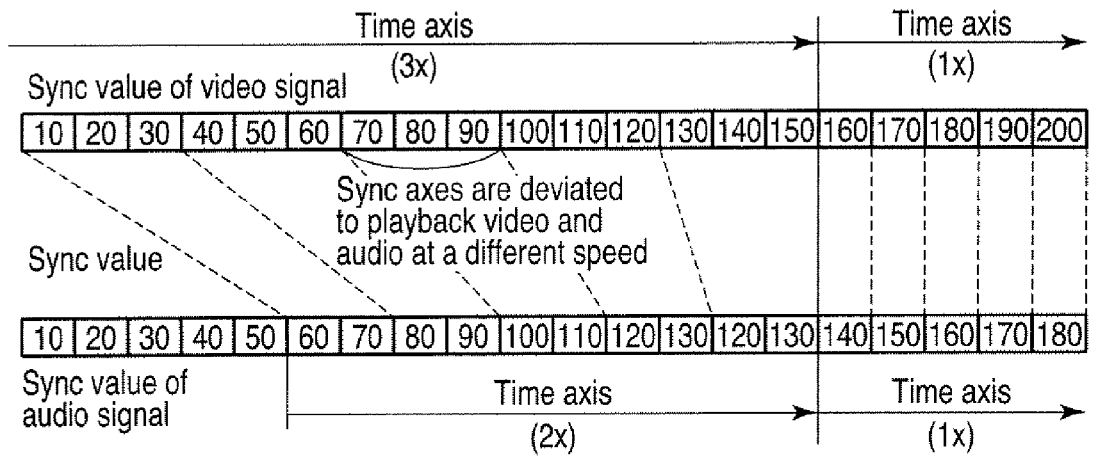
FIG. 9 is an exemplary diagram showing an example of a method of achieving synchronization to control the scene playback speed for both the video and the audio, when the playback speed is changed between a given high-speed and a normal-speed as shown in FIG. 8, according to an embodiment of the invention.

In the case of FIG. 8, the video signal, for example, is reproduced at 3×-speed, while the audio signal is reproduced at 2×-speed. The problem that the user may hardly hear the audio is thereby solved as will be explained in detail with reference to FIG. 9.

That is, the sync axis of the video signal and the sync axis of the audio signal are deviated by a specific value, with respect to the signal sync value. Hence, the video and the audio can be played back at different speeds. This can smoothly change the speed.

As will be explained later, the index information acquired can be referred to, thereby to determine the signal sync value that is avail at the scene changing. Therefore, the audio can easily be synchronized with the audio, using the sync axis calculated by either the video playback speed calculation module 101 or the audio playback speed calculation module 102.

Figure 10:
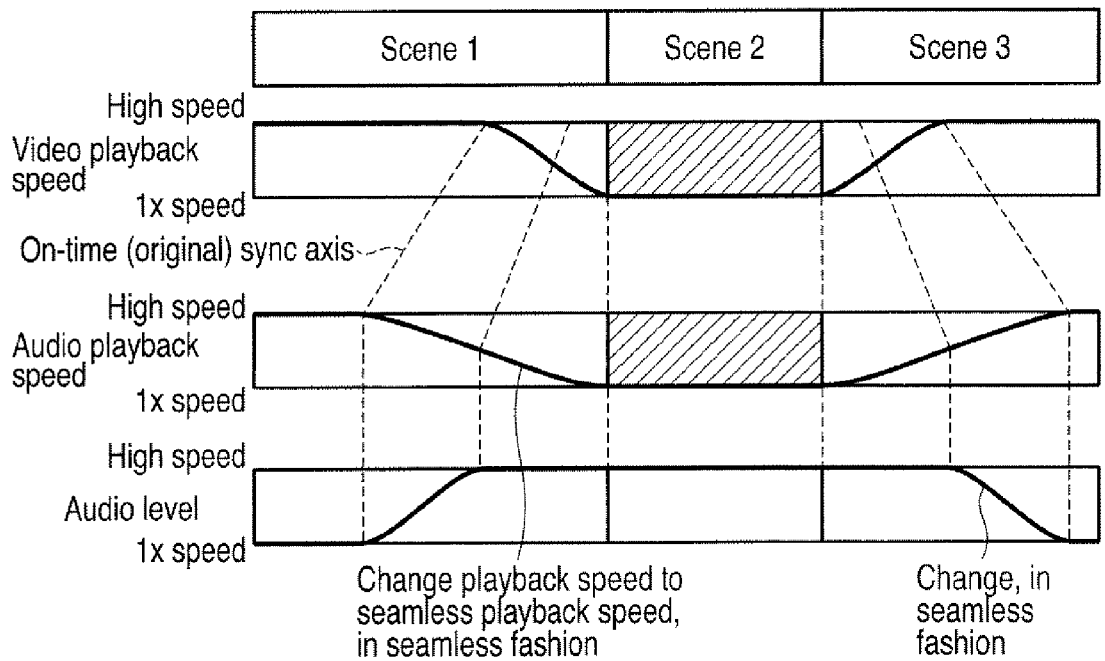
FIG. 10 is an exemplary diagram showing an example of how the scene playback speed is controlled and how the audio volume is changed in order to reduce the influence on the video and audio when the playback speed is changed between a given high-speed and a normal-speed in the video and audio reproduction apparatus of FIG. 1, according to an embodiment of the invention.

FIG. 10 illustrates the principle of an exemplary playback method that can suppress the influence on the video and audio when the playback mode is changed between the high-speed playback and the normal-speed playback. That is, FIG. 10 shows the principle of the seamless playback and that of the scene-by-scene playback speed changing (video and audio shifting).

Assume that Scenes 1 and 3 are subjected to the high-speed playback and Scene 2 located between Scenes 1 and 3 is subjected to the 1×-speed (normal-speed) playback (that is, the speed factor "N" is 1). Of the blocks that precede on the time axis, by a specific time, the start of Scene 2 being played back at the normal-speed, those blocks to reproduce per unit time are gradually decreased in number (that is, the speed factor N, i.e., N is a given number (times), is gradually reduced). Furthermore, during the high-speed playback, the audio is first gradually reduced in volume until the audio signal playback speed drops to, for example, about 2×-speed, and is then gradually increased, thereby shortening the time during which the user may hardly hear the audio played back. This prevents the audio from so abruptly changing in volume that the user cannot concentrate his or her attention on the content being played back.

In the case of FIG. 10, the video signal and the audio signal are reproduced at a speed gradually decreasing from N× (N times ×) speed (N is a given number) to 2×-speed in a specific period immediately before the start of reproduction of both signals at a normal-speed (i.e., before the start of Scene 2). As a result, the number of blocks reproduced per unit time is gradually deceased. In addition, the audio reproduced from the audio signal is increased in volume at the time the audio signal playback speed drops to, for example, about 2×-speed. This solves the problem that the user may hardly hear the audio reproduced.

Figure 11:
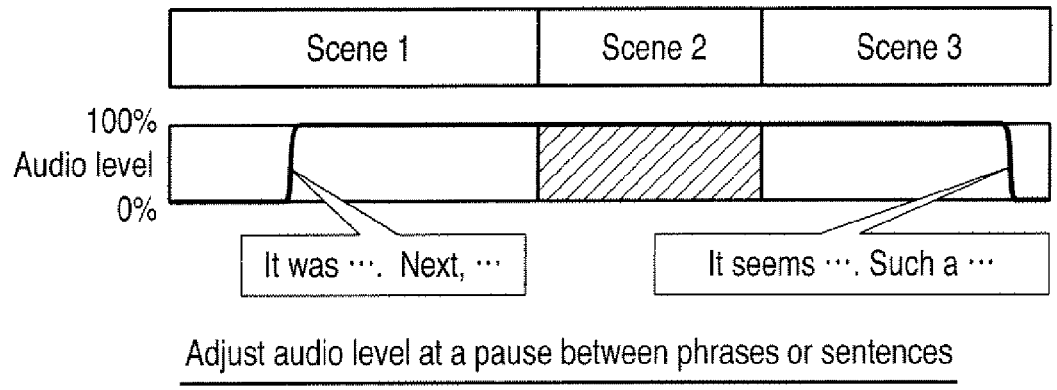
FIG. 11 is an exemplary diagram showing an example of how the scene playback speed is controlled and how the audio volume is changed at a pause between any phrases or sentences, in order to reduce the influence on the video and audio when the playback speed is changed between a given high-speed and a normal-speed in the video and audio reproduction apparatus of FIG. 1, according to an embodiment of the invention.

More specifically, the magnitude of the audio signal can be gradually increased (fade-in) or gradually decreased (fade-out) at the scene changing. This prevents an abrupt change in the volume of reproduced audio, suppressing the generation of noise or audio unnatural to the user. As shown in FIG. 11, the magnitude of the audio signal may be changed at a pause between phrases or sentences, as already practiced in the speech recognition methods.

Figure 12:
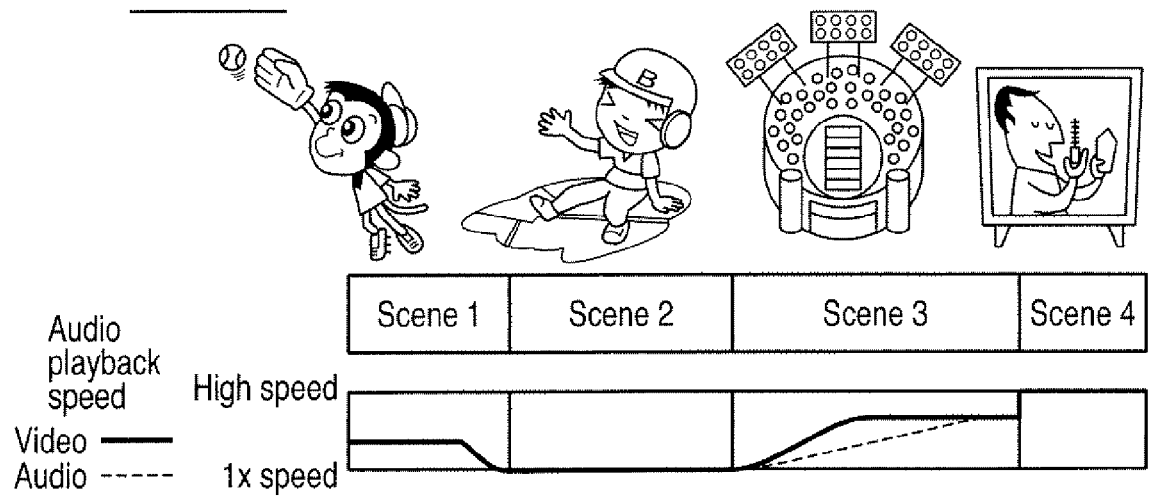
FIG. 12 is an exemplary diagram showing an example of how the given high-speed playback and the normal-speed playback are performed in the video and audio reproduction apparatus of FIG. 1 with program information, according to an embodiment of the invention.

FIG. 12 illustrates the case where the playback speed is changed between the high-speed playback and the normal-speed playback, with reference to program information.

The program information is composed of keywords, performers, genres, broadcast hours, etc., which can be obtained from, for example, an electronic program guide (EPG). Alternatively, the program information may be generated by the manufacturer of the player or the user thereof. As already shown in FIG. 2, the program information includes an information item (i.e., preset conditions for playback), such as recommended menu and recommended service, which cannot be acquired directly from content obtainable from the servers on networks.

The user may refer to, for example, the information recorded in the recommended service or the like, acquiring the data representing the time when a scoring scene, for example, has been broadcast. In this case, the playback speed is reduced immediately before the scene, and the normal-speed playback may then be started at the scoring scene.

As seen from FIG. 12, the program information shows that Scene 4 is a commercial that follows the proper part of the content (i.e., program). Thus, based on the program information, Scene 4 can be automatically played back a high-speed.

Various degrees of importance are allocated, as index information items, to the respective scenes. An appropriate playback speed is changed for each scene in accordance with degree of importance allocated to the scene. The scoring scene, for example, is played back at the normal-speed, and ordinary scenes are played back at higher speeds. Further, when the scene changes from an important scene to an ordinary scene, the video signal and the audio signal are reproduced at different speeds. The least important scene, such as a commercial, is played back at a high-speed, because it is least related to the proper part of the content.

Figure 13:
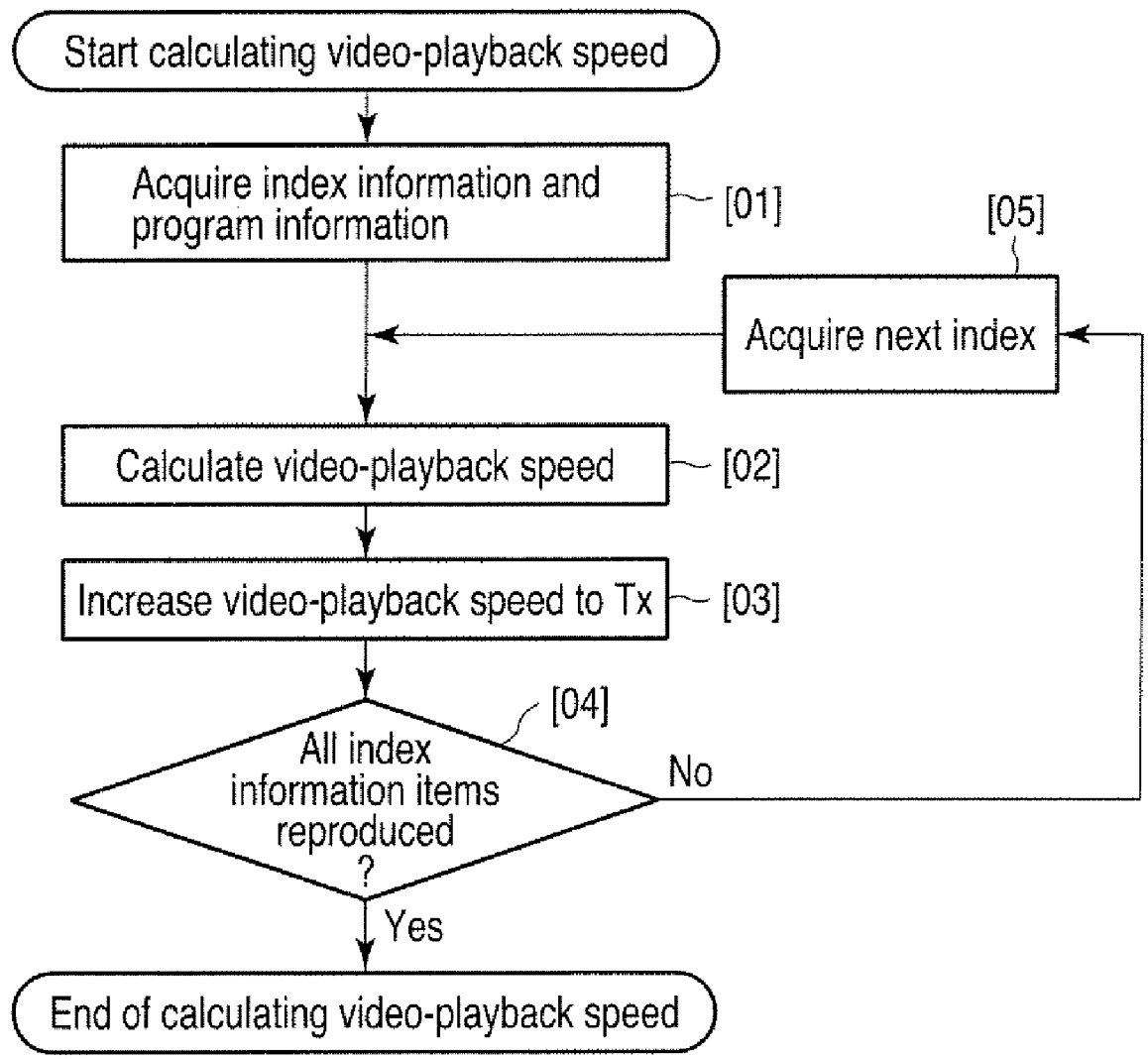
FIG. 13 is an exemplary diagram showing an example of a method of changing the speed of playing back the video, between a given high-speed and a normal-speed with index information in the video and audio reproduction apparatus of FIG. 1, according to an embodiment of the invention.

FIG. 13 illustrates an exemplary method of calculating a speed at which to reproduce a video signal, and determining which scene should be played back at the high-speed, with reference to index information (or both index information and program information).

As shown in FIG. 13, an index (program) information item is acquired (Block [1]). The speed factor T for video playback is calculated (Block [2]).

The playback speed is increased to Tx-speed in accordance with the speed factor T calculated in Block [2] (Block [3]).

Whether all index (program) information items have been reproduced is determined, since ii the no-remaining the next index information item is acquired with the "terminated notification" (Block [5-NO]). Thus, Block [2] and Block [3] are repeated until all index information items are reproduced (Block [4]).

If all index (program) information items are found to have been reproduced (Block [5-YES]), the "terminated notification" is issued. At this point, the process of calculating the speed at which to reproduce a video signal comes to an end.

Figure 14:
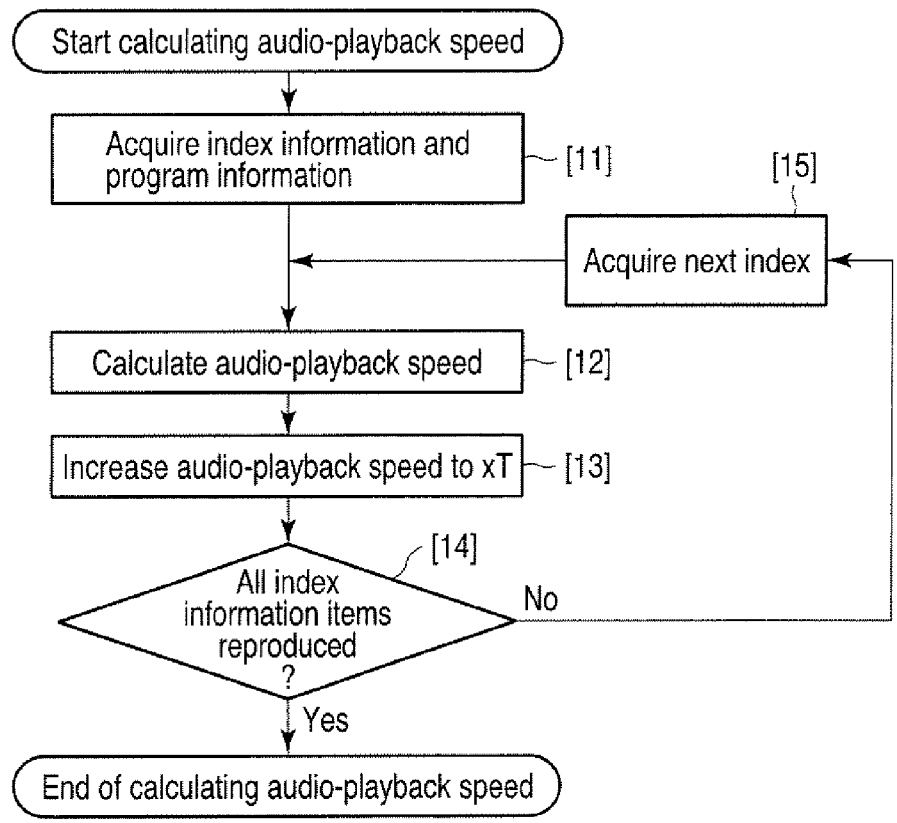
FIG. 14 is an exemplary diagram showing an example of a method of changing the speed of playing back the audio, between a given high-speed and a normal-speed with index information, in the video and audio reproduction apparatus of FIG. 1, according to an embodiment of the invention.

FIG. 14 illustrates an exemplary method of determining a period during which to perform the high-speed playback and the playback speed at which to perform playback during this period.

As shown in FIG. 14, the index information (program information) is acquired at first (Block [11]). Then, the speed factor T for audio playback is calculated (Block [12]).

In accordance with the speed factor T thus calculated in Block [12], the playback speed for the audio signal is increased to Tx-speed (Block [13]).

Whether all index (program) information items have been reproduced is determined, since if the no-remaining the next index information item is acquired with the "terminated notification" (Block [15-NO]). Thus, Block [12] and Block [13] are repeated until all index information items are reproduced (Block [14]).

If all index (program) information items are found to have been reproduced (Block [15-YES]), the "terminated notification" is issued. At this point, the process of calculating the speed at which to reproduce a video signal comes to an end.

Figure 15:
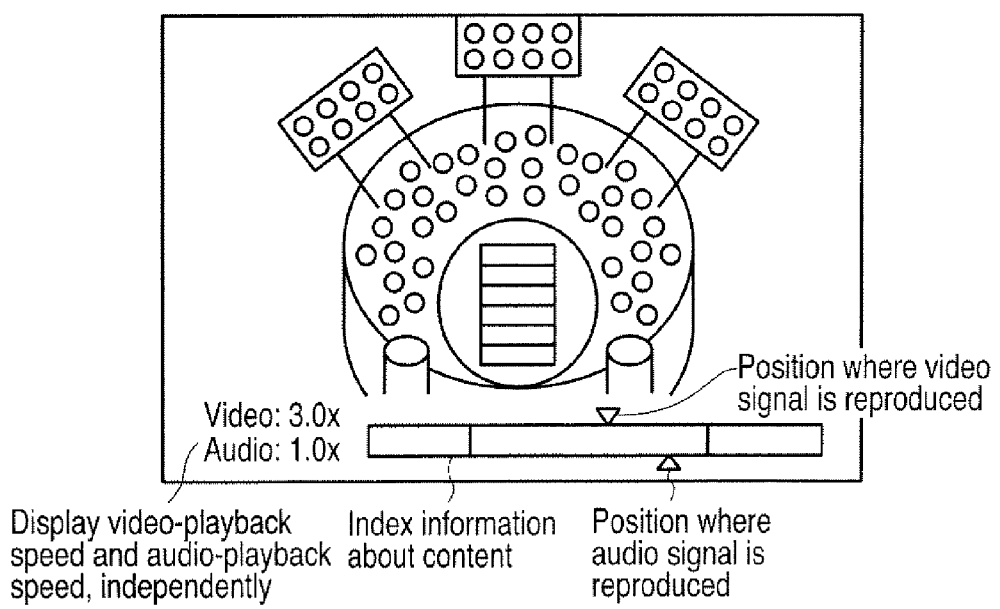
FIG. 15 is an exemplary diagram showing an example of how the time axis of video and that of audio are displayed in the playback screen, while the playback speed is being changed between a given high-speed and a normal-speed in the video and audio reproduction apparatus of FIG. 1, according to an embodiment of the invention.

FIG. 15 shows a case in which the time axes of video and audio are displayed on the screen of the video and audio output apparatus 50 connected to the video and audio playback apparatus of FIG. 1, when the video and audio are reproduced while the playback speed is being switched between the high-speed and the normal-speed.

As seen from FIG. 15, a bar graph 15C is shown at a particular position on the screen of the video and audio output apparatus 50, for example below the region where the subscript (character data) is usually displayed. The bar graph 14c indicates the speed 15A (or speed factor) at which the video signal is reproduced and the position 15B that the video being reproduced assumes on the time axis. Seeing the bar graph, the user may compare the speed 15A with the position 15B. The user can therefore easily know how long the content will last from now on.

At the same time, the speed 15D (speed factor) at which the audio signal is reproduced and the position 15E that the audio being reproduced assumes on the time axis are displayed, on the sides of the bar graph 15C, respectively. As the distance between the positions 15E and 15B, which the audio being reproduced and the video being reproduced assume on the time axis, respectively, becomes shorter, the user can recognize that a highlight scene (i.e., interesting scene) will be played back soon. Thus, the calculated playback speeds of video and audio and the index information are displayed, together with the video played back. The user can therefore visually perceive how the video signal and the audio signal are being reproduced.

Figure 16:
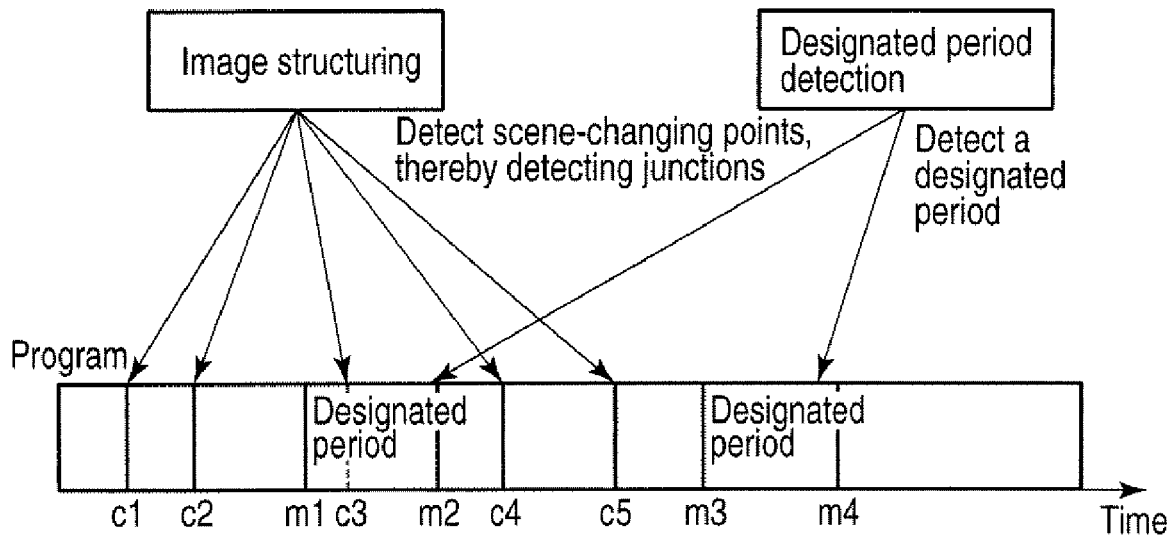
FIG. 16 is an exemplary diagram showing an example of a method of extracting a given period in the video and audio reproduction apparatus of FIG. 1, according to an embodiment of the invention.
Figure 17:
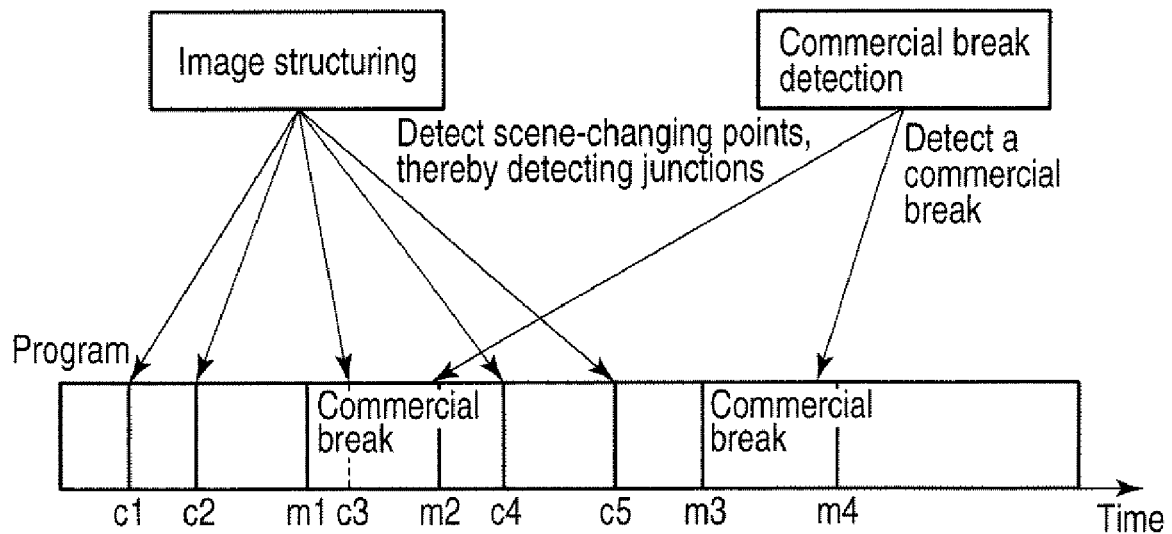
FIG. 17 is an exemplary diagram showing an example of a method of extracting a given period, i.e., commercial break in the video and audio reproduction apparatus of FIG. 1, according to an embodiment of the invention.

As shown in FIGS. 16 and 17, any commercial part of the content can be automatically subjected to the high-speed playback, by using the methods practically used, i.e., "method of structuring video" and "method of detecting designated period."

For example, the "method of structuring video" shown in FIG. 16 is first performed, detecting chapter junctions c1, c2, ..., c5 (first division data). Then, the "method of detecting designated content parts" is performed, detecting mute periods m1, m2, m3 and m4 (second division data) on the time axis of the program (content). Thereafter, any period in which the audio mode or the stereophonic mode continues, not changing at all, for example the period between mute periods m1 and m2 or between the mute periods m3 and m4, is set as a designated period. The period thus designated can therefore detected as a commercial break. Whether the time between any mute period and the next mute period is a multiple of a preset time (A) may be determined to detect a commercial break with higher accuracy.

The commercial break thus detected is subjected to the high-speed playback as has been explained with reference to FIGS. 6 and 7, to FIGS. 8 and 9 or to FIG. 10. As a result, the playback speed can be switched between the high-speed and the normal-speed, while suppressing the occurrence of any factor that may prevent the user from concentrating his or her attention on the content being played back.

As has been described, an embodiment of this invention can provide a video and audio reproduction apparatus that can change the video playback speed and the audio playback speed independently of each other and can control both playback speeds such that the user's visual and aural perception during the high-speed playback is almost the same as at the normal-speed playback.

Further, the embodiment of this invention can reproduce the audio more slowly than video, starting at a specific time before the time when the playback of a specific Scene is started, or when the speed factor of playback speed is changed to 1, while the video playback speed and the audio playback speed are being changed independently of each other. This solves the problem that the user may hardly hear the audio reproduced.

Moreover, while the video playback speed and the audio playback speed are being changed independently of each other, the embodiment of this invention can gradually decreases the number of blocks reproduced per unit time (speed factor of playback speed), which is the high playback speed higher than the normal playback speed, and can first reduce the volume of the audio during the high-speed playback and then start gradually increasing the volume of audio, at the time when the speed of playing back the audio decreases to about 2×-speed. This can shorten the time during which the user may hardly hear the audio reproduced.

Thus, the audio played back and the video played back are prevented from changing in volume and brightness, respectively, so abruptly that the user may not concentrate his or her attention on the content being played back. That is, the speeds at which to play back the audio and video can be controlled such that the user's visual and aural perception during the high-speed playback is almost the same as at the normal-speed playback.

Hence, the video playback speed and the audio playback speed can be changed independently of each other in the video and audio reproduction apparatus according to this invention. The video and audio reproduction apparatus is therefore useful, reducing the load on the user.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video and audio reproduction apparatus comprising:
    an isolation module configured to isolate a video signal and an audio signal from a content;
    a video demodulator configured to demodulate the video signal isolated by the isolation module;
    an audio demodulator configured to demodulate the audio signal isolated by the isolation module;
    a video playback speed setting module configured to set a video playback speed at which to reproduce the video signal by gradually decreasing from a high playback speed higher than a normal playback speed to the normal playback speed, in a time between a specific time that precedes, on the time axis, a start time of playback of a scene with the video signal at the normal playback speed and the start time of the playback of the scene at the normal playback speed, the video playback speed being measured by a number of blocks reproduced per unit time;
    an audio playback speed setting module configured to set an audio playback speed at which to reproduce the audio signal higher than a normal playback speed to the normal playback speed, in a time between a specific time that precedes a start time of the playback of the scene with the audio signal at the normal playback speed, on the time axis, to the start time of the playback of the scene at the normal playback speed, the audio playback speed being measured by a number of blocks reproduced per unit time, and the audio playback speed is controlled when the scene starts, in order to synchronize the audio playback speed with the video playback speed, the audio playback speed setting module also gradually decreasing the number of blocks reproduced per unit time, or the high playback speed, at a specific time that precedes, on the time axis, the playback of the scene at the normal playback speed, thereby decreasing audio in volume during the high speed playback, and gradually increasing the audio in volume when the audio playback speed drops to a prescribed value; and
    a signal processor configured to process the video signal at the video playback speed set by the video playback speed setting module and demodulated by the video demodulator and the audio signal at the audio playback speed set by the audio playback speed setting module and demodulated by the audio demodulator, such that the video signal and the audio signal are made reproducible the video and audio reproduction apparatus.

2. The video and audio reproduction apparatus of claim 1, wherein the audio playback speed is controlled when the scene starts, in order to synchronize the audio playback speed to be slower than the video playback speed, and then starts gradually increasing the audio in volume.

3. The video and audio reproduction apparatus of claim 2, wherein the audio playback speed setting module gradually decreases the audio playback speed at the specific time that precedes, on the time axis, the playback of the scene, in accordance with program information other than information obtainable from program information that can be acquired from an external apparatus and program information that can be acquired from a content.

4. The video and audio reproduction apparatus of claim 2, wherein the audio playback speed setting module gradually decreases the number of blocks reproduced per unit time, or the high playback speed, at the specific time that precedes, on the time axis, the playback of the scene at the normal playback speed, in accordance with information other than information obtainable from a content that can be acquired from an external apparatus.

5. The video and audio reproduction apparatus of claim 1, wherein the video playback speed setting module decreases the video playback speed at a specific time that precedes, on the time axis, the playback of the scene, in accordance with program information other than information obtainable from program information that can be acquired from an external apparatus and program information that can be acquired from a content.

6. The video and audio reproduction apparatus of claim 1, wherein the audio playback speed setting module decreases the audio playback speed at a specific time that precedes, on the time axis, the playback of the scene, in accordance with program information other than information obtainable from program information that can be acquired from an external apparatus and program information that can be acquired from a content.

7. The video and audio reproduction apparatus of claim 1, wherein the video playback speed setting module gradually decreases the number of blocks reproduced per unit time, or the high playback speed, at the specific time that precedes, on the time axis, the playback of the scene at the normal playback speed, in accordance with information that denote a scene changing.

8. The video and audio reproduction apparatus of claim 1, wherein the signal processor displays a time data on the time axis about the video signal being played back at present on the time axis, and time data on the time axis about the audio signal being played back at present on the time axis for comparison.

9. A video and audio reproduction apparatus comprising:
an isolation module configured to isolate a video signal and an audio signal from a content;
a video demodulator configured to demodulate the video signal isolated by the isolation module;
an audio demodulator configured to demodulate the audio signal isolated by the isolation module;
a video playback speed setting module configured to gradually decrease a video playback speed at which to reproduce the video signal from a high video playback speed higher than a normal video playback speed to the normal video playback speed, in a time between a specific time that precedes, on the time axis, a start time of playback of a scene with the video signal at the normal video playback speed and the start time of the playback of the scene at the normal video playback speed, the video playback speed being measured by a number of blocks reproduced per unit time;
an audio playback speed setting module configured to set an audio playback speed at which to reproduce the audio signal higher than a normal audio playback speed to the normal audio playback speed, in a time between a specific time that precedes a start time of playback of the scene with the audio signal at the normal audio playback speed, on the time axis, to the start time of the playback of the scene at the normal audio playback speed, the audio playback speed being measured by a number of blocks reproduced per unit time and being controlled when the scene starts, in order to synchronize the audio playback speed to be slower than the video playback speed, the audio playback speed setting module is further configured to gradually decrease the number of blocks reproduced per unit time, at the specific time that precedes, on the time axis, the playback of the scene at the normal audio playback speed, in accordance with information other than information obtainable from a content that can be acquired from an external apparatus; and
a signal processor configured to process the video signal at the video playback speed set by the video playback speed setting module and demodulated by the video demodulator and the audio signal at the audio playback speed set by the audio playback speed setting module and demodulated by the audio demodulator, such that the video signal and the audio signal are made reproducible the video and audio reproduction apparatus.

10. A video and audio reproduction method comprising:
isolating a video signal and an audio signal from a content;
demodulating the video signal isolated;
demodulating the audio signal isolated;
setting a video playback speed at which to reproduce the audio signal to gradually decrease from a high playback speed higher than a normal playback speed to the normal playback speed, in a time between a specific time that precedes, on a time axis, a start time of the playback of a scene at the normal playback speed and the start time of the playback of the scene at the normal playback speed, the video playback speed being measured by a number of blocks reproduced per unit time;
setting an audio playback speed at which to reproduce the audio signal higher than normal playback speed to the normal playback speed, in a time between a specific time that precedes a start time of playback of the scene at the normal playback speed, on the time axis, to the start time of the playback of the scene at the normal playback speed, the audio playback speed being measured by a number of blocks reproduced per unit time and is controlled when the scene starts, in order to synchronize the audio playback speed with the video playback speed, and
outputting the video signal and the audio signal, for which reproduction speeds have been set,
wherein the audio is gradually decreased in the number of blocks reproduced per unit time at the specific time that precedes, on the time axis, the playback of the scene at the normal playback speed, thereby decreasing audio in volume during a high playback speed, and then starting to gradually increase the audio in volume when the audio playback speed drops to a prescribed value.

* * * * *